United States Patent
Rodriguez Bravo et al.

(10) Patent No.: US 11,204,994 B2
(45) Date of Patent: Dec. 21, 2021

(54) INJECTION ATTACK IDENTIFICATION AND MITIGATION

(71) Applicant: INTERNATIONAL BUSINESS MACHINES CORPORATION, Armonk, NY (US)

(72) Inventors: Cesar Augusto Rodriguez Bravo, Alajuela (CR); Craig M. Trim, Ventura, CA (US); Wayne F. Tackabury, West Tisbury, MA (US); John R. Feezell, Pikeville, TN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 244 days.

(21) Appl. No.: 16/407,859

(22) Filed: May 9, 2019

(65) Prior Publication Data

US 2020/0356667 A1 Nov. 12, 2020

(51) Int. Cl.
*G06F 21/55* (2013.01)
*G06F 21/31* (2013.01)
*G06F 21/56* (2013.01)

(52) U.S. Cl.
CPC .......... *G06F 21/554* (2013.01); *G06F 21/316* (2013.01); *G06F 21/552* (2013.01); *G06F 21/566* (2013.01)

(58) Field of Classification Search
CPC .... G06F 21/554; G06F 21/566; G06F 21/316; G06F 21/552
See application file for complete search history.

(56) References Cited

U.S. PATENT DOCUMENTS

| | | | |
|---|---|---|---|
| 5,960,085 A | 9/1999 | de la Huerga | |
| 6,021,403 A | 2/2000 | Horvitz | |
| 7,108,177 B2 | 9/2006 | Brookner | |
| 7,941,534 B2 | 5/2011 | de la Huerga | |
| 8,528,091 B2 | 9/2013 | Bowen et al. | |
| 9,258,217 B2 | 2/2016 | Duffield et al. | |

(Continued)

OTHER PUBLICATIONS

Patel et al., "A survey of intrusion detection and prevention systems" Information Management & Computer Security 18.4 (2010): 277-290.

(Continued)

*Primary Examiner* — Huan V Doan
(74) *Attorney, Agent, or Firm* — William Hartwell; Matthew M. Hulihan; Heslin Rothenberg Farley & Mesiti PC

(57) ABSTRACT

Injection attack identification and mitigation includes tracking characteristics of user input by a user to a computer system via input device(s), building and maintaining a user profile based on the tracking and that provides a baseline of expected characteristics of user input, the baseline defined by the tracked characteristics, monitoring input to the computer system in real time as the input is provided to the computer system, identifying, based on the monitoring and on a comparison of characteristics of the monitored input to the baseline of expected characteristics, a potential malicious code injection as part of the monitored input to the computer system, and performing mitigation processing based on identifying the potential malicious code injection.

20 Claims, 9 Drawing Sheets

(56) References Cited

U.S. PATENT DOCUMENTS

| | | | |
|---|---|---|---|
| 9,591,022 B2 | 3/2017 | Purpura | |
| 2005/0183143 A1* | 8/2005 | Anderholm | G06F 11/3438 |
| | | | 726/22 |
| 2008/0109895 A1 | 5/2008 | Janevski | |
| 2013/0340076 A1* | 12/2013 | Cecchetti | G06F 21/6218 |
| | | | 726/23 |
| 2017/0091450 A1* | 3/2017 | Turgeman | G06F 21/32 |
| 2018/0219909 A1* | 8/2018 | Gorodissky | H04L 43/50 |
| 2018/0255076 A1* | 9/2018 | Paine | G06F 21/57 |
| 2018/0365309 A1 | 12/2018 | Oliner et al. | |
| 2020/0226298 A1* | 7/2020 | Appleboum | G06F 11/3684 |
| 2020/0356665 A1* | 11/2020 | Denney | G06N 5/04 |

OTHER PUBLICATIONS

Scarfone et al., "Sp 800-94. guide to intrusion detection and prevention systems (idps)". NIST Special Publication 800-94 (2007): 127 pgs.

Modi et al. "A survey of intrusion detection techniques in cloud". Journal of network and computer applications 36.1 (2013): 42-57.

Kou et al. "Survey of fraud detection techniques". Networking, sensing and control, 2004 IEEE international conference on. vol. 2. IEEE, 2004: 749-754.

Killourhy et al. "Comparing anomaly-detection algorithms for keystroke dynamics". Dependable Systems & Networks, 2009. DSN'09. IEEE/IFIP international conference on. IEEE, 2009: 10 pgs.

"Cost of a Data Breach Study". Retrieved on Jan. 29, 2019 from the Internet URL: <https://www.ibm.com/security/data-breach>, 2018, 6 pgs.

"Six Reasons Why the Global Ponemon 2017 Cost of Data Breach Study Is a 'Must Read'". Retrieved on Jan. 29, 2019 from the Internet URL: <https://www.ibm.com/security/infographics/data-breach/>, 2017, 14 pgs.

"USB Rubby Ducky". Retrieved on Mar. 7, 2019 from the Internet URL: <https://hakshop.com/products/usb-rubber-ducky-deluxe>, 4 pgs.

Beckman, K., "Automatically log off idle users in Windows". Retrieved on Mar. 7, 2019 from the Internet URL: <https://4sysops.com/archives/automatically-log-off-idle-users-in-windows/>, Mar. 26, 2015, 64 pgs.

"Automatically log off users when logon time expires (local)". Retrieved on Jan. 29, 2019 from the Internet URL: <https://technet.microsoft.com/en-US/library/cc938001.aspx>, Sep. 9, 2008, 1 pg.

Mundhra, A., "How to Automatically Log Off or Lock Your Windows PC With Auto Lock". Retrieved on Jan. 29, 2019 from the Internet URL: <https://www.guidingtech.com/11583/automatically-lock-or-log-off-windows-pc-auto-lock/>, May 21, 2012, 4 pgs.

Ashutosh, KS, "200 Keyboard Shortcuts (Windows) to Boost Your Productivity". Retrieved on Jan. 29, 2019 from the Internet URL: <https://www.hongkiat.com/blog/100-keyboard-shortcuts-windows/>, Nov. 22, 2017, 13 pgs.

Wikipedia, "Table of keyboard shortcuts". Retrieved on Jan. 29, 2019 from the Internet URL: <https://en.wikipedia.org/wiki/Table_of_keyboard_shortcuts>, 14 pgs.

"How Target's Point-of-Sale System May Have Been Hacked". Retrieved on Jan. 29, 2019 from the Internet URL: <https://www.tripwire.com/state-of-security/vulnerability-management/targets-point-sale-system-compromised/>, Jan. 14, 2014, 4 pgs.

Constantin, L., "Target's point-of-sale terminals were infected with malware". Retrieved on Jan. 29, 2019 from the Internet URL: <https://www.computerworld.com/article/2487643/cybercrime-hacking/target-s-point-of-sale-terminals-were-infected-with-malware.html>, Jan. 13, 2004, 6 pgs.

Benchoff, B., "Duckhunting—Stopping Rubber Ducky Attacks". Retrieved on Jan. 29, 2019 from the Internet URL: <https://hackaday.com/2016/10/28/duckhunting-stopping-rubber-ducky-attacks/>, Oct. 28, 2016, 13 pgs.

"Prevent RubberDucky (or other keystroke injection) attacks". Retrieved on Jan. 29, 2019 from the Internet URL: <https://github.com/pmsosa/duckhunt>, 3 pgs.

"Duckhunting—Stopping Automated Keystroke Injection Attacks". Retrieved on Jan. 29, 2019 from the Internet URL: <http://konukoii.com/blog/2016/10/26/duckhunting-stopping-automated-keystroke-injection-attacks/>, Oct. 26, 2016, 9 pgs.

"Converts a USB Rubber ducky script into a Kali Nethunter friendly format for the HID attack". Retrieved on Jan. 29, 2019 from the Internet URL: <https://github.com/byt3bl33d3r/duckhunter>, 2 pgs.

"Keyboard and mouse HID client drivers". Retrieved on Apr. 9, 2019 from the Internet URL: <https://docs.microsoft.com/en-US/windows-hardware/drivers/hid/keyboard-and-mouse-hid-client-drivers>, Apr. 19, 2017, 12 pgs.

"HID Architecture". Retrieved on Apr. 9, 2019 from the Internet URL: <https://docs.microsoft.com/en-us/windows-hardware/drivers/hid/hid-architecture>, Apr. 19, 2017, 4 pgs.

Mell, Peter, et al., "The NIST Definition of Cloud Computing", NIST Special Publication 800-145, Sep. 2011, Gaithersburg, MD, 7 pgs.

\* cited by examiner

| DELTA | ACTIONS |
|---|---|
| >50% | - DISPLAY ON SCREEN WARNING;<br><br>- AUTOMATICALLY LOG INCIDENT WITH METADATA;<br><br>-ADJUST USER PROFILE FOR USAGE OF ADVANCED FEATURE; HEIGHTEN ACCELERATION OF EXPECTED BEHAVIOR IF USER ACTIVELY DISMISSES THE WARNING TO INDICATE THIS WAS INTENDED |
| >100% | - LOG OFF |
| >200% | - LOG OFF;<br><br>- LOCK USER;<br><br>- DISCONNECT FROM NETWORK;<br><br>- AUTOMATICALLY LOG INCIDENT WITH METADATA |

FIG. 2

| DEVIATING CHARACTERISTIC | ACTIONS |
|---|---|
| USAGE OF KEYBOARD SHORTCUTS | - DISPLAY ON SCREEN WARNING; |
| USAGE OF RELATIVE PATHS FOR OPERATING SYSTEM NAVIGATION | - LOG OFF;<br>- DISCONNECT FROM NETWORK |
| USAGE OF ADVANCED MANAGEMENT TOOLS OR OPERATING SYSTEM FEATURES BY COMMAND LINE INVOCATION | - LOG OFF;<br>- LOCK USER;<br>- DISCONNECT FROM THE NETWORK;<br>- AUTOMATICALLY LOG INCIDENT WITH METADATA |

FIG. 3

INJECTION ATTACK IDENTIFICATION AND MITIGATION

BACKGROUND

Cyberattacks are prevalent and further increasing in frequency. Meanwhile, their detrimental impact to affected systems is higher than ever and becoming more serious. Companies increasingly focus additional resources to cyberattack prevention and effect mitigation due to the potential for significant impact costs that sometimes reach into the millions of dollars.

An example type of cyberattack is a malicious code injection in which malicious commands are injected into a computer system. There are several mechanisms by which malicious entities remotely inject commands into a computer system. Examples include viruses, Trojans, worms, ActiveX controls, infected web browsers or pages, exploited or malicious internet plug-ins, and others. In some cases, hackers leverage a USB device or other form of Human Interface Device (HID) to inject code into the computer. Keyboard or other input device drivers, for instance, may be used by an arbitrary USB device to spoof an input device, such as a keyboard, in order to inject malicious device input. Under current approaches, this goes undetected by antivirus programs installed on the computer, thus posing a security risk.

SUMMARY

Shortcomings of the prior art are overcome and additional advantages are provided through the provision of a computer-implemented method. The method tracks characteristics of user input by a user to a computer system via one or more input devices of the computer system. The method builds and maintains a user profile for that user based on the tracking. The user profile provides a baseline of expected characteristics of user input by that user. The baseline is defined at least in part by the tracked characteristics. The method monitors input to the computer system in real time as the input is provided to the computer system. The method identifies, based on the monitoring and on a comparison of characteristics of the monitored input to the baseline of expected characteristics, a potential malicious code injection as part of the monitored input to the computer system. The method also performs mitigation processing based on identifying the potential malicious code injection.

Further, a computer system is provided that includes a memory and a processor in communication with the memory, wherein the computer system is configured to perform a method. The method tracks characteristics of user input by a user to a computer system via one or more input devices of the computer system. The method builds and maintains a user profile for that user based on the tracking. The user profile provides a baseline of expected characteristics of user input by that user. The baseline is defined at least in part by the tracked characteristics. The method monitors input to the computer system in real time as the input is provided to the computer system. The method identifies, based on the monitoring and on a comparison of characteristics of the monitored input to the baseline of expected characteristics, a potential malicious code injection as part of the monitored input to the computer system. The method also performs mitigation processing based on identifying the potential malicious code injection.

Yet further, a computer program product including a computer readable storage medium readable by a processing circuit and storing instructions for execution by the processing circuit is provided for performing a method. The method tracks characteristics of user input by a user to a computer system via one or more input devices of the computer system. The method builds and maintains a user profile for that user based on the tracking. The user profile provides a baseline of expected characteristics of user input by that user. The baseline is defined at least in part by the tracked characteristics. The method monitors input to the computer system in real time as the input is provided to the computer system. The method identifies, based on the monitoring and on a comparison of characteristics of the monitored input to the baseline of expected characteristics, a potential malicious code injection as part of the monitored input to the computer system. The method also performs mitigation processing based on identifying the potential malicious code injection.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 depicts example actions for mitigation processing based on deviation between characteristics of monitored input and a baseline of expected characteristics, in accordance with aspects described herein;

FIG. 3 depicts example actions for mitigation processing based on a type of deviation between characteristics of monitored input and a baseline of expected characteristics, in accordance with aspects described herein;

DETAILED DESCRIPTION

Figure 1:
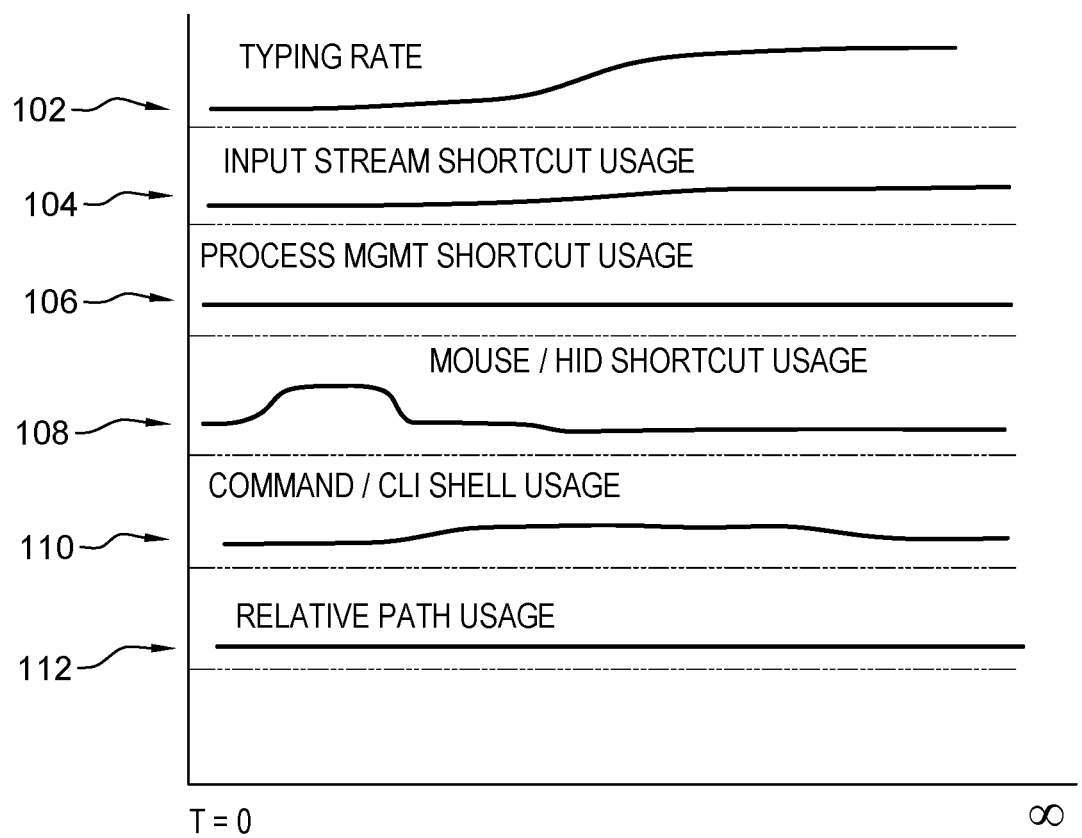
FIG. 1 depicts a time-series representation of characteristics of user input to a computer system, in accordance with aspects described herein.

Described herein are approaches for attack identification and mitigation. Example attacks include malicious code injection attacks in which a malicious entity (e.g. a hacker) leverages a USB device or other Human Interface Device (HID) to inject code into a computer by using native USB drivers, for instance keyboard drivers. In the case of a keyboard, the computer's operating system, believing the USB device to be a keyboard based on how the USB device presents itself to the operating system, might regard the injection as keystroke input. A malicious entity can inject 1,000 words or more per minute, making it an efficient attack in terms of the potential for damage in a relatively short amount of time, and an effective attack because it may go undetected as such by the operating system.

A malicious device disguises itself as a normal, innocuous HID device, such as a keyboard, to inject malicious content into the HID input stream. The malicious content is injected 'in the background', often unnoticed by the user who is unsuspecting that the system is being attacked by the injection of malicious input. Using this mechanism, the content can invoke administrative and possibly kernel-interacting malicious scripting, as an example. Though in some examples presented herein a keyboard is the input device, aspects apply to other types (classes) of HIDs. Example classes of HIDs include, but are not limited to: keyboards, pointing devices (e.g. mice), gaming controllers (including steering wheels, pedals, gloves, and throttles), knobs, sliders, buttons, sensors (accelerometers, thermometers, bar code scanners, etc.), switches, and visual/audio/haptic feedback devices.

Presented are systems that detect malicious code injections, for instance attack keystrokes, based on a variety of pattern-detection algorithms. A smart system adaptively learns user behaviors via characteristics of that user's input to a computer system by tracking those characteristics, for instance typing speed, languages used in the input, usage of keyboard shortcuts, usage of relative paths, typing patterns, commands executed by invocation via the user input, and other characteristics. These behaviors inform a user profile that is built and maintained for that user. The user profile provides a baseline of expected characteristics of user input by that user. The expected characteristics are those that can be expected from that user in terms of further user input received in subsequent interactions with the computer system. The baseline indicates what is expected. What is expected can be defined based on a variety of factors, including tracking what the user has historically input. Then, a process can monitor other input to the computer system in real time as the input is provided to the computer system, and identify, based on monitoring that input and comparing characteristics of that input to the baseline of expected characteristics from the user profile, potential malicious activity, for instance malicious code injections that may be included as part of that monitored input. Different users can be associated with respective user profiles, and the user profile for the system to use in terms of identifying the baseline for comparison to monitored input may be the profile associated with the user account currently logged on to the system.

Various processing can be performed based on identifying potential malicious activity. Example processing are actions to mitigate or entirely prevent damage from that activity. When monitored computer activity does not align with what is expected from a user of the computer system, this can suggest malicious activity is afoot and appropriate actions can be taken in response. Aspects can therefore enhance data security, for instance integrity of data and confidentiality of data, and data privacy by automatically taking actions to prevent/mitigate damage caused by a malicious code injection. It is also noted that some embodiments can identify a malicious code injection without requiring that the substance of actual data being input be known or analyzed. This can advantageously maintain confidentiality of input data (e.g. around the malicious injection) in these instances. An example such situation occurs when malicious injection is detected based on speed of character or word input in which only a volume of character/words per unit of time is considered, and the content of the input itself (the commands typed for instance), is not considered.

A system/process can actively monitor for any deviations between the characteristics of the monitored input and what is considered baseline, regular behavior. If a deviation is detected, this can trigger any desired mitigating actions. Examples include, but are not limited to: querying the user as to an intent of the input or for confirmation that the user is inputting the data by displaying a nonobvious dialog dismissal sequence; logging the user account off/out of the computer system; locking the computer system; disconnecting the computer system from the network (e.g. disable the network adapter, invoke packet filtering, blacklist the system in firewalls/gateways, etc.); automatically logging an incident including available contextual metadata with the appropriate IT/security entity, and/or displaying on screen warning for the user, as examples. The mitigating actions to use can be based on the severity of the deviation from the baseline. Some deviations may be of very low severity. For instance, the baseline could indicate that the user rarely uses keyboard shortcuts and has never used the Ctrl+V shortcut (commonly used to paste copied content). Detecting the Ctrl+V key combination in the monitored input could trigger identification of a potential malicious activity. But this key combination is very common and the user could have easily picked this up very quickly and begun using it. This deviation is likely of low severity. In this case, a popup to the user asking the user to confirm that the user input this key combination could safely address the situation. If the user indicates that the user did enter this combination, the confirmation of such can be taken to inform an adjustment to the user's profile to indicate that at least use of this shortcut is acceptable, and perhaps also to adjust the baseline to be more lenient in terms of allowing entrance of other common keyboard shortcuts without identifying that the activity is malicious. In contrast, observing for the first time that the monitored input includes an attempted invocation of a highly complex and destructive system command purportedly from a user with an elementary level of sophistication with the computer, as indicated by the user profile, suggests that the deviation is more severe and may be grounds for a more aggressive mitigating action, for instance to disconnect the system from the network and lock the system until an administrator can assess the legitimacy of the input.

The monitoring can be performed in real time and to detect malicious input in the input stream to the computer system from the input devices. It may be desired to detect this input before it reaches other components of the computer system, for instance a target application. Even moderate computing capabilities of contemporary systems would enable the monitoring of the input and the comparison between the baseline and what is being observed to be performed very quickly, and unnoticeable to a user. In some examples, a buffer is implemented as described below for the monitored input to enable comparisons to take place in real time as the input is provided.

A user profile may be influenced by the characteristics of the user input being tracked. In addition, other system/user features could be used to tailor and improve the profile. One example is user characteristics, referring to characteristics of the user (e.g. age, profession, languages spoken/used including the primary language, location, role, and others). The baseline in the user profile can be defined at least in part based on such user characteristic(s). Another example is characteristics of the computer system, for instance, a role of the system, expected use of the system, software loaded on the system, a location of the system, and others. The baseline in the user profile can be defined at least based on such computer system characteristic(s).

Tracking the characteristics of the user input and maintaining the user profile can include refining the user profile and updating the baseline of expected characteristics based on an observed evolution in tracked characteristic(s) of the user input. The evolution can be ascertained by observing trend(s) over time in the tracked characteristic(s). The user's sophistication and efficiency in interacting with the computer system is expected to increase over time. This can be observed in trends of tracked user activity. Increase in typing/input speed and usage of compound keyboard/mouse actions are just a couple of examples of characteristics that are expected to trend upward over time.

The following presents some examples in which activity is monitored and mitigating actions are taken in accordance with aspects described herein:

Example #1

System detects a malicious code injection based on usage of keyboard shortcuts: User A is a novice user working for a company in a clerical capacity. User A has never used keyboard shortcuts, for instance Ctrl+C, Win+R, or [Command key]+V. Since many malicious scripts rely on the use of keyboard shortcuts to navigate within a target system, the system could trigger predetermined action(s) to protect the computer against the attack if it detects a sudden use of keyboard shortcuts. In this case, however, as the agent has not detected user A's knowledge of or inclination to use copy/paste or application run shortcuts, the issuance of Ctrl-V input may be flagged as an exception by the agent (in particular, since an 800-character paste buffer accompanies the paste action, for example). As copy/paste is a fairly core skill, the possibility that it has become part of user A's interactive repertoire should be considered. Therefore, user A is presented with two nonstandard dialogs (which can themselves vary as they are issued, so as not to allow the malicious system actor on a USB hack to predict and dismiss them to its benefit). The first is "The system has detected that you are pasting a large amount of data", with a dismissal button "This is me", an information button "Tell me why I'm getting this message . . . ", and a cancel button "Cancel input". If the user clicks the "This is me" button, the second dialog could display "Should I continue to monitor copy and paste?" with a dismissal button: "No thank you", an acceptance button "Please do", and another cancel button "Cancel input". If the "No thank you" button is invoked, then the profile for the user can be modified to indicate that user A indicated a proficiency that was not previously detected, although the action can continue to be monitored with possibly a reduced threshold for exception.

Example #2

System detects a malicious code injection based on usage of Operating System navigation shortcuts: User B normally uses simple keyboard shortcuts including Ctrl+C and Ctrl+V but never used application-level navigation shortcuts such as Alt+Space or Alt+F4. The system detects this deviation and triggers a predetermined action to protect the user's computer. The action could resemble a prompt as in Example #1 above or something more disruptive and proactively protective since some of these application-level shortcuts cause more drastic actions like application termination, or rearrangement even when used legitimately.

Example #3

System detects a malicious code injection based on the user's average speed of typing or other input: User C is a technical person who commonly uses many different shortcuts and whose average typing speed is 50 words per minute (wpm). Malicious scripts tend to inject code rapidly or all at once (for instance at 1,000 wpm or more). Aspects described herein can detect that such a high delta of 950 wpm (1,000-50) is above some predetermined tolerance level—either a threshold wpm such as 200 or some delta tolerance of, say, 100% corresponding to double the user's average typing speed. The system could therefore trigger a predetermined security action. In this case, the unexpected nature of the input and its suspicious volume could lead to a presumption that it was initiated by a malicious actor. The system could quarantine/delete the input and drop the malicious actor, for instance by disconnecting from the network and/or disabling the USB device as examples.

Example #4

System detects a malicious code injection based on usage of navigation via relative paths: User D uses his computer primarily to check email and has never navigated into folders other than the user's Documents folder using a mouse. The system detects the use of relative paths (PATH variables) for navigation via interactive input and batch/powershell script execution from removable media. Example PATH variables include %USERPROFILE%\, %TEMP%\, and %windir%\. There is a high likelihood that the navigation through PATH variables is a malicious script operating in the background, particularly if the computer system also detects that other, legitimate, actions such as invocation of an .inf file for application installation is not also occurring contemporaneous with the detection. The system triggers a predetermined security action to stop the attack, such as termination of the user login to log out the user. A similar action could be taken if input is trying to redefine the type of crucial environment variables noted above.

Example #5

System detects a malicious code injection based on usage of Advanced Management tools or operating system features via the command line: User E uses a computer as a point-of-sale system at his company store. The computer stores confidential financial information and customer data. A system as described herein detects input commands related to port management on the operating system, for instance: echo open [IP] [PORT]; and ftp-s. Based on the user profile for user E, this may be an attack. The system therefore triggers predetermined action(s) to stop the attack, for instance disconnecting the network connection until or unless rescheduling of commands under an elevated permission role is initiated and detected.

Example #6

System detects a malicious code injection based on usage of unusual or unintended operating system functions or features: A computer is used only to control Supervisory Control and Data Acquisition (SCADA) equipment at a factory. An approach described herein detects input of a command related to SMTP email transfer: $SMTPInfo=New-Object Net.Mail.SmtpClient($Smtp-Server, 587). Based on a profile for this user (as the system), it can be determined that this computer is not used to send emails via SMTP (or at all). The system can flag the attempted invocation of the command as a potential threat and trigger a predetermined security action before the command is passed on and executed.

Overall, there are hundreds of commands that are not generally known by most users but are widely used by malicious actors. These commands can be triggers for mitigating actions unless a user profile indicates that the subject command falls within the user's baseline of expected characteristics.

Accordingly, aspects described herein provide facilities to detect malicious code injections, such as malicious injection of keystroke data, based on characteristics of user input, such as the usage of keyboard shortcuts, usage of operating system navigation shortcuts, average speed of typing, usage of operating system navigation via relative paths, usage of Advanced Management tools or operating system features via the command line, and/or usage of unusual or unintended operating system functions or features, as examples. A process can assess a likelihood that incoming input events are malicious based upon a user profile that provides a baseline of what is expected given the user's historical input behavior. The profile can be modified over time.

These aspects can advantageously be attached/integrated into other security offerings, such as antivirus offerings, providing a real solution to malicious remote access software, keystroke injectors, and many other forms of attack on data security (privacy and integrity).

In an aspect, a process tracks characteristics of user input by a user to a computer system via one or more input devices of a computer system. The system itself, for example, could record user keyboard patterns and characteristics of keyboard input, including those of or related to: typing speed of the user and/or other typing patterns, language(s) used in what the user types, keyboard shortcut usage, navigation via interactive input using relative paths and PATH environment variables of an operating system, and user input-based invocation of executable commands.

The characteristics of user input can be tracked over time. FIG. 1 depicts a time-series representation of characteristics of user input to a computer system, in accordance with aspects described herein. The example of FIG. 1 depicts a relatively simple model for a time-series collection of evolutionary profile data. The time-series collection of data from which the characteristics of the user input are ascertained is gathered across periods of time. The characteristics can fluctuate across the periods of time. As a consequence, the user profile may be refined to update the baseline of expected characteristics based on such observed evolution(s) in the tracked characteristic(s) of the user input. Specifically with reference to FIG. 1, typing speed 102, input stream shortcut usage 104, process management shortcut usage 106, mouse/HID shortcut usage 108, command/cli shell usage 110, and relative path usage 112 are graphically depicted over time starting from about from time t=0. Trends in these characteristics are observable from these graphical representations, though sophisticated computer processing could also identify trends not readily observable to an administrator. Since user skills may improve over time, shortcut usage, typing rate, and other characteristics may also increase by some practically reasonable rate of improvement. An increase from 20 wpm to a consistent 100 wpm within one day is an example where the rate of improvement likely exceeds what is practically achievable by a user, and therefore could be flagged as suspect.

Characteristics such as those of FIG. 1 can help define a user profile and the baseline provided thereby. Other characteristics, such as secondary user characteristics, can also shape the user profile and baseline. Examples of user characteristics include: age, profession and/or role, and language, though others are possible. These characteristics can inform likely or expected capabilities, roles, etc. of the subject user in order to inform what would be considered as expected for that user. Taking age as an example, it might be expected that the wpm typing rate of a frequent computer user in grade school would increase at a much greater rate than that of a retired user who has been typing for years and who casually uses the computer. The profession of a user can inform an expected sophistication in using the computer. An individual working as a computer specialist is much more likely to quickly invoke obscure administrative commands, while a user in another profession not typically tied to computer technology may not be expected to exhibit such proficiency. Similarly, if English is the native language of a user communicating online, then input received in a different language never observed in that user's typing could indicate a malicious injection.

Additionally or alternatively, computer/user metadata characteristics can also shape the user profile and baseline. A role of the computer system (as in the SCADA example above), historical/expected use of the system, the software loaded, location of the system, and security event alert paths and methods, along with enterprise user identity, are all examples of characteristics of computer/user metadata that can shape the profile and inform expected input received from the user.

The built user profile provides the baseline of expected characteristics of user input by the user, to inform a 'normal' range of what is allowed/expected as legitimate user input. The baseline is defined at least in part given the tracked characteristics, and can optionally be defined also by additional characteristics such as those noted above. Using the desired factors, the user profile is created and can be used as the baseline to compare against monitored input. Thus, a process monitors input to the computer system in real time as the input is provided to the computer system. The input could be legitimate user input, malicious (injected) input, or a combination of the two. The injected input could be partially or wholly injected among other, legitimate, user input in an attempt to obscure it from being detected. Based on this monitoring and on a comparison of characteristics of that monitored input to the baseline expected characteristics, the process can identify a potential malicious code injection as part of that monitored input to the computer system. The characteristics of the monitored input can be selected to correlate to any desired characteristics and would generally align with the characteristics of the user input that have been tracked. Examples include speed at which the monitored input is provided from an input device of the computer system, the commands that the input attempts to execute, navigation using one or more PATH variables, invocation of keyboard shortcuts, invocation of operating system navigation shortcuts, invocation of system management or administrative tools via a command line interface, invocation of unexpected software functions given a defined role of the computer system, and so on. The comparison can indicate some amount by which at least one characteristic of the monitored input deviates from the baseline of expected characteristics. If the deviation exceeds some predefined threshold, this can be regarded as a potential threat. Thresholds or tolerances can be defined in any way desired. One example is as a percent deviation from the expected, average, or 'normal' as indicated by the profile. In general, statistical analysis of tracked user input can define a baseline against which other input behavior is compared to identify anomalies or significant enough deviations. It is noted that a deviation, even if severe, may be legitimate in that the activity is not malicious. Mitigation processing discussed elsewhere herein can be configured for proper handling of what was detected in order to address false positives.

If a deviation is found that exceeds predetermined tolerance level(s), this indicates an anomaly and potential malicious code injection. Mitigation processing is performed based on identifying that potential malicious code injection. Since the deviation could be the result of benign activity, albeit outside of an expected range, various security-related actions could be triggered. The actions could be tailored depending on the severity or the deviation. Example actions include but are not limited to: logging the user out of the computer system, locking/disabling the user's account or ability to authenticate with the computer system, disconnecting or blocking the system from the network, closing system or network ports, automatically logging and reporting an incident or event with metadata to a security department or other remote entity, and/or displaying on screen warnings with unexpected or dynamic dismissal and navigation patterns to thwart attempts to navigate them under malicious process control, as examples. In this latter regard, the mitigation processing can include an action of presenting an on-screen prompt or challenge for the user to validate whether the user is the one providing the monitored input to the computer system. A specific example is a prompt for the user to 'Click the red button if you just input commands X, Y, Z'. This will require the user to interact with the system to click on a displayed red button, confirming that actions are not from a bot or other malicious actor. If the prompt is not accepted or completed successfully, the system could trigger additional desired security actions to secure the computer system, for instance to log off (or sign out) any user logged into the system, as one example. Security measure(s) can be automatically initiated, invoked, and/or performed.

On the other hand, based on the user correctly completing the on-screen challenge, the input is taken as being legitimate and this can inform a refinement to the user profile. The baseline of expected characteristics can be updated to reflect an expanded user input skillset that incorporates characteristics of the monitored input, i.e. whatever triggered detection of the anomaly. This adjustment to the baseline can reflect the new user skill and avoid future false positives.

The tolerance levels can define when to trigger given action(s) and which specific actions to trigger. The actions of the mitigation processing can be selected based on a severity of the deviation of the characteristics of the monitored input from the baseline of expected characteristics. For example, the system could have several configured predefined tolerance levels of increasing degree of severity. FIG. 2 depicts example actions for mitigation processing based on deviation between characteristics of monitored input and a baseline of expected characteristics, in accordance with aspects described herein. The table of FIG. 2 indicates three different deltas—>50%, >100%, and >200%, and actions correlated to those deltas. The delta refers to a percent deviation from a baseline. The higher the delta that is exceeded the more severe the deviation is considered to be. The deltas could be identified over a set time frame tailored to what is being sampled. Using an example of a user input speed characteristic, the timeframe could be a window of 60 seconds. If the profile indicates a words-per-minute baseline of 30 wpm, monitored input of above 45 wpm would be deemed a deviation (delta) of greater than 50%.

By FIG. 2, exceeding the 50% delta triggers different actions. One is display of an on-screen warning. Another is automatically logging an incident with the security department, including all available metadata. The third action is performed if the user dismisses the warning to indicate that the input was intended, in which case the mitigation action adjusts the user's profile for usage of the advanced feature (the faster wpm input speed in this example).

Exceeding the 100% delta triggers an automatic user account logoff from the computer system. Exceeding the 200% delta forces logoff, user account lock, disconnection from the network, and logging the incident.

The actions performed under the different deltas could be mutually exclusive, i.e. perform only the actions for the delta category in which the monitored activity falls, or cumulative, as in the example of FIG. 2, i.e. perform actions of the delta category in which the monitored activity falls and also the actions of the less severe delta categories.

While FIG. 2 depicts example actions correlated to different tolerances of deviation on a given characteristic, FIG. 3 depicts example actions for mitigation processing based on a type of deviation between characteristics of monitored input and a baseline of expected characteristics, in accordance with aspects described herein. The approach of FIGS. 2 and 3 could be used in conjunction with each other.

The table of FIG. 3 indicates three different deviating characteristics and actions correlated to those deviations. One deviation is the unexpected usage of keyboard shortcut(s), in which case the triggered action is to display an on-screen warning, prompt, or challenge. Another deviation is the usage of relative paths for OS navigation, in which case the triggered actions are to log off the user and disconnect the system from the network. The last deviation is the usage of advanced management tools or OS features by command line invocation, in which case the triggered actions are to log off the user, lock the user account, disconnect the system from the network, and automatically log an incident with the security department including all available metadata.

Aspects can leverage system architectural constructs implementing a Human Interface Device (HID) architecture to perform the monitoring of input in the HID input stream. HID is a standard well-known in the industry, as are constructs and example implementations thereof in various operating systems. In the context of the Windows® line of operating systems offered by Microsoft Corporation (of which WINDOWS is a registered trademark), monitoring agent(s), for instance a respective agent for each class of HID monitored, executing in kernel space could be implemented as $3^{rd}$ party filter drivers between .sys components of the HID architecture implementation. These agents could communicate to a profile management and analytics process executing in user space and performing aspects described herein. A malicious actor that executes, for instance in user space, can coexist with the agent(s) and profile management/analytics process. Input injected from the malicious actor into the HID input stream can be redirected to the profile management/analytics process for analysis.

Regardless of whether incoming input is from a user or a malicious agent, the input is buffered in accordance with aspects described herein for analysis by the profile management and analytic process. That analysis can constitute the tracking the characteristics of user input and the monitoring of the other input for potential malicious activity. In this regard, the monitoring can buffer the monitored input from the input stream for comparison of the characteristics of that monitored input to the baseline of expected characteristics as indicated by a user profile stored in a database for the profile management and analytic process. Some portions of the monitored input may not be identified as being part of a potential malicious code injection. These safe portions of the input could be passed to intended destination(s).

In a particular example, a ring buffer is maintained for storage of input. A value for the size of the buffer is configurable as desired, but in one example is 512 bytes. The ring buffer affords a kernel multithreaded architecture to avoid perceptible latency in input forwarding and is able to support the kind of input rate detection as described herein, where user input and malicious input redirection can coexist.

It is also noted that some aspects of the monitoring can be both content-neutral and semantically-neutral. Assuming that the buffer is drained and transmitted as depicted above, then in some examples there is no required analysis of data, which may be confidential or other sensitive data, in the input stream. Consequently, some monitoring described herein can operate to identify injection attacks without inspecting the input. Analysis of input speed can be content-agnostic, meaning what is being type need not be known.

Figure 4:
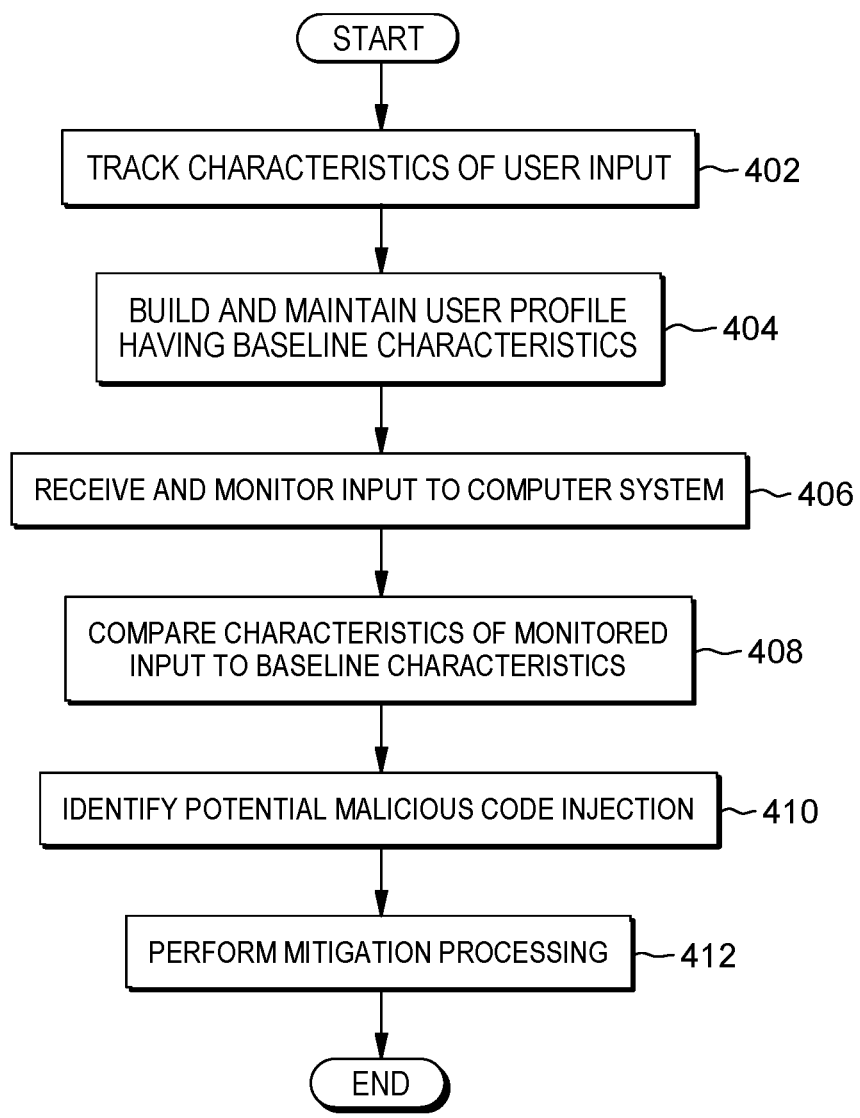
FIG. 4 depicts an example process for injection attack identification and mitigation, in accordance with aspects described herein.

FIG. 4 depicts an example process for malicious attack identification and mitigation, in accordance with aspects described herein. The process of FIG. 4 and related processes depicted and described with reference to FIGS. 5-7, or aspects thereof, can be performed by one or more computer systems, which may include a user computer system with which a user interacts to provide input and/or one or more other computer systems in communication with a user computer system. In some embodiments, aspects such as user profile building and refining, input monitoring, and/or user input characteristic tracking are performed by system(s) other than the user's system on which the input is being received. For instance, cloud or other remote entities could support processes described herein by performing aspects thereof and returning results to the user system for use in other aspects of the processes.

The process of FIG. 4 begins by tracking (402) characteristics of user input, which is input by the user to a computer system via one or more input devices of the computer system. Characteristics could include words per minute, commands typed, shortcuts used, and others.

Figure 5:
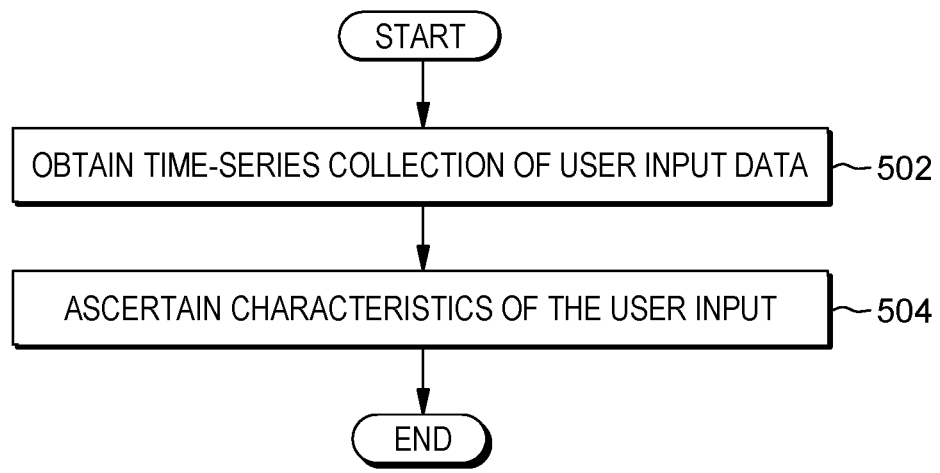
FIG. 5 depicts an example process for tracking characteristics of user input, in accordance with aspects described herein.

FIG. 5 depicts one example of a process for tracking characteristics of user input, in accordance with aspects described herein. Referring to FIG. 5, the tracking includes obtaining (502), across periods of time, a time-series collection of data from which the characteristics of the user input are ascertained. Example data includes keystroke data and other input data. The characteristics can fluctuate across the periods of time, exhibiting trends, variations, and the like. The process continues by ascertaining (504) characteristics of that user input, for instance by identifying trends, determining averages, preforming extrapolations, or the like, and generally figuring out normal, regular, or expected user input behavior.

The tracked characteristics can include characteristics of keyboard input. Examples include typing speed of the user, primary language in which the user types, and/or keyboard shortcut usage. Additionally or alternatively, the characteristics include characteristics about the user's navigation using PATH environmental variables of an operating system of the computer system and/or the user's input-based invocation of executable commands.

Referring back to FIG. 4, the process builds and maintains (404) a user profile for that user based on the tracking of 402. The user profile provides a baseline of expected characteristics of user input. The baseline represents a normal or expected behavior of the user and is defined at least in part based on the tracked characteristics. It is noted that there may be a range around that baseline of what is allowed or expected as legitimate (not deviate) user input. In some examples, the range is defined using thresholds or tolerances.

Figure 6:
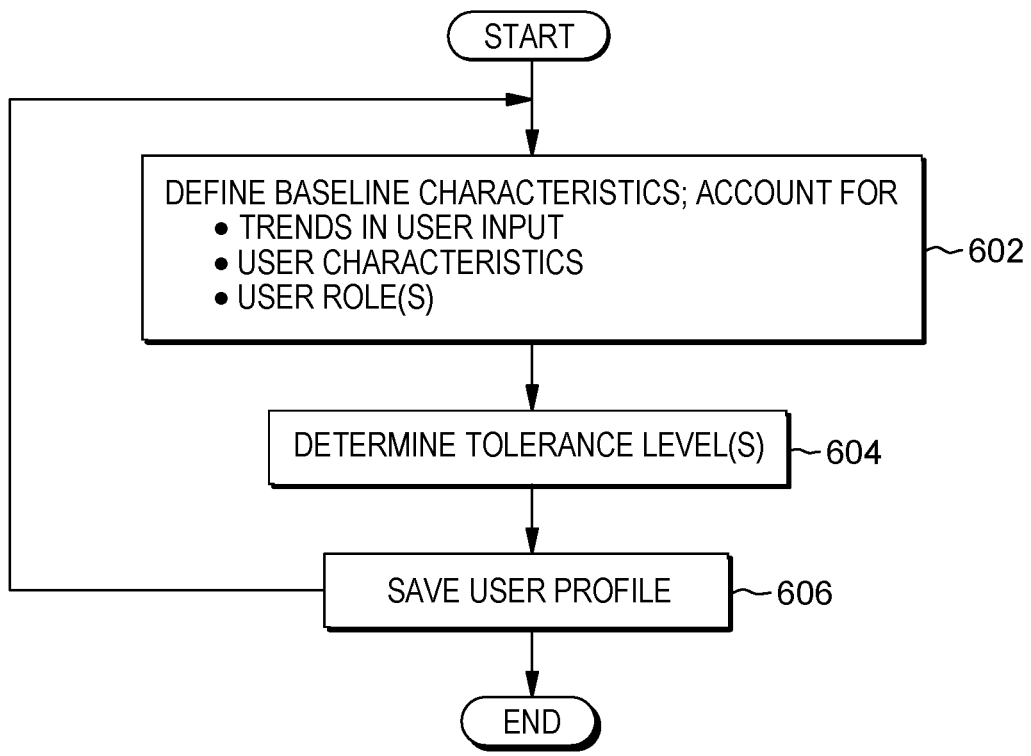
FIG. 6 depicts an example process for building a user profile with baseline expected characteristics of user input, in accordance with aspects described herein.

FIG. 6 depicts an example process for building a user profile with baseline expected characteristics of user input, in accordance with aspects described herein. The process begins by defining (602) baseline characteristics. This includes identifying and accounting for (i) trend(s) in the user input and tracked information, (ii) user characteristics such as those described above, and (iii) computer system characteristics such as those described above, as examples. The process then determines (604) tolerance level(s) and, optionally, actions to perform as part of mitigation processing if those tolerance levels are exceeded. Predefined tolerance levels can be informed by thresholds, such as those set by an administrator. Exceeding a predefined tolerance level indicates a potential malicious code injection that is included in the monitored input to the computer system. Actions of the mitigation processing can be selected based on a severity of the deviation of the characteristics of the monitored input from the baseline of expected characteristics. The predefined tolerance levels can be of increasing degree of severity, indicating more aggressive actions to trigger as part of the mitigation processing depending on the severity of the deviation. The process saves (606) the baseline characteristics and optionally indications of tolerance levels and/or correlated actions in the user profile. The user profile can be refined over time when/if there are changes in the tracked characteristics. The tracking (402) can be an ongoing process. A user can reasonably be expected to become faster at typing keyboard input over time, so the tolerance level for words per minute would typically be adjusted upward. An observed evolution in tracked characteristics of the user input which correspond to a trend observed over time in the tracked characteristics can also inform profile refinement.

Referring back to FIG. 4, the process receives and monitors (406) input to the computer system. The input refers to any monitored input, which could be legitimate user input, malicious input, or a combination of the two. The monitoring may be performed in real time as the input is provided to the computer system. The input can be received through a Human Interface Device of the computer system and provided to an input stream of device input. In some examples, the monitoring buffers the monitored input from the input stream for comparison of the characteristics of that monitored input to the baseline of expected characteristics. In this regard, there may be some analysis performed on the monitored input to extract or ascertain characteristics of that input.

The process continues by comparing (408) characteristics of the monitored input to the baseline of expected characteristics provided by the user profile. The comparison can use any tolerances or thresholds to determine whether received input is regarded as a significant enough deviation to warrant mitigation processing. Based on the monitoring (406) and the comparison (408) of characteristics of the monitored input to the baseline of expected characteristics, the process identifies (410) a potential malicious code injection. The input is regarded as only a potential malicious code injection because it could instead be legitimate input, albeit outside of an expected range.

Figure 7:
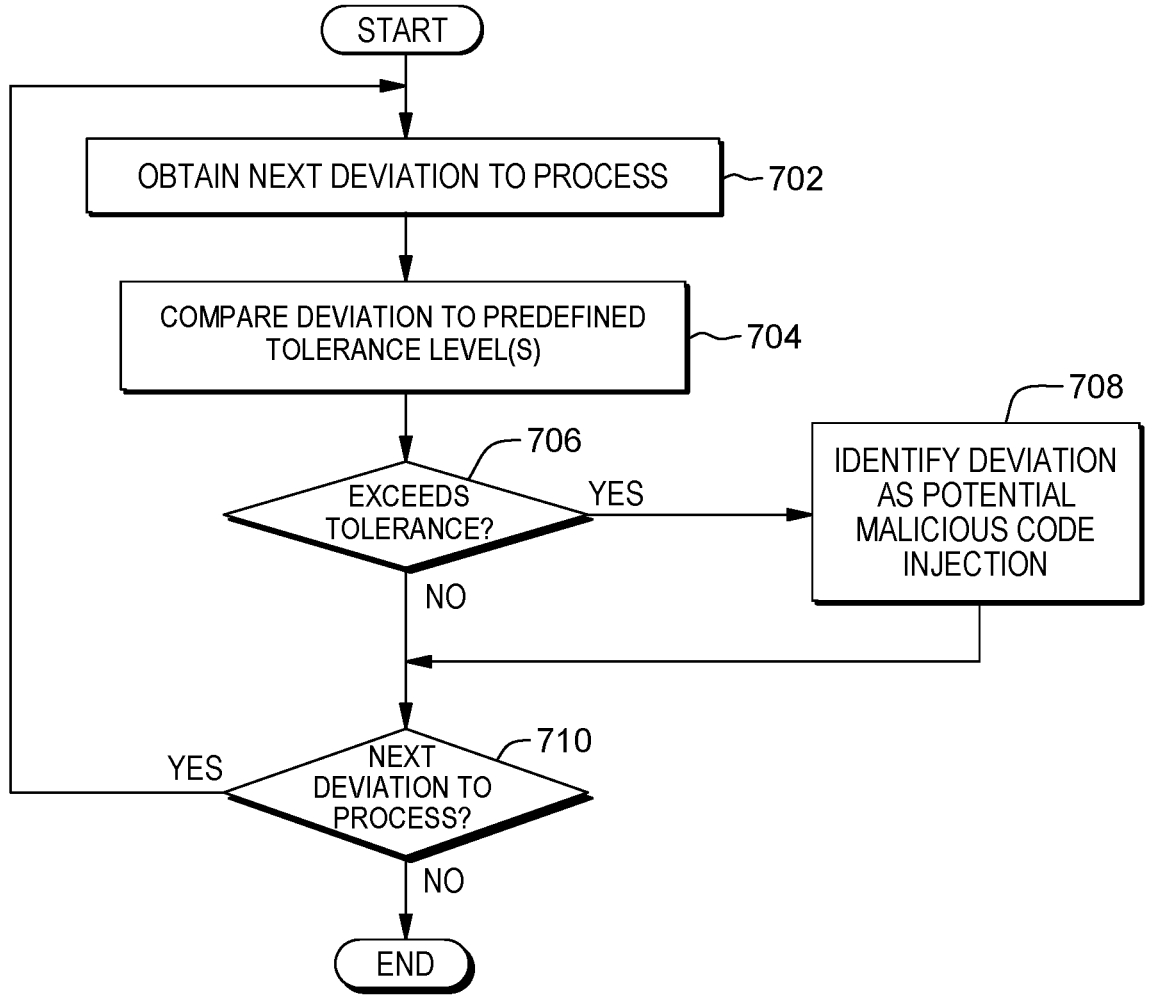
FIG. 7 depicts an example process for identifying a potential malicious code injection, in accordance with aspects described herein.

FIG. 7 depicts one example of a process for identifying a potential malicious code injection, in accordance with aspects described herein. In general, the process handles each deviation identified by the comparing (408) to determine whether it is considered potentially malicious. The process begins by obtaining/identifying (702) a next deviation of the characteristics of the monitored input from the baseline of expected characteristics to process. The process then compares (704) the deviation to predefined tolerance level(s), for instance those based on configured thresholds of allowed deviation. Identification of a potential malicious code injection is based on this comparison indicating at least a threshold amount of deviation from the baseline of expected characteristics in at least one characteristic of the monitored input. Example such characteristics are speed of character input from an input device of the computer system, navigation using one or more PATH variables, invocation of keyboard shortcuts, invocation of operating system navigation shortcuts, invocation of system management or administrative tools via a command line interface, and invocation of unexpected software functions given a defined role of the computer system. Thus, the process determines (706) whether the deviation exceeds a tolerance. If so (706, Y), the process identifies the deviation, which might be embodied as a particular combination of keyboard or other input, as a potential malicious code injection. Then, or if instead it is determined at 706 that the deviation does not exceed any tolerance (706, N), the process determines (710) whether there is a next deviation to process. If so (710, Y), the process iterates by returning to 702. Otherwise, the process ends when there are no more observed deviations to process (710, N). Portions of the monitored input that are not identified as being part of a potential malicious code injection could be passed to destination(s) of those portions of the monitored input, for instance a userland application. Input determined to be potentially malicious can be quarantined, deleted, or maintained in the buffer at least temporarily for mitigation processing to be performed.

The end of FIG. 7 could prompt mitigation processing action selection. The selection selects action(s) of mitigation processing and can reference data structures such as tables as in FIGS. 2 and 3. Selected actions can be based on the particular deviated characteristic and/or a severity of the deviation of the characteristics of the monitored input from the baseline of expected characteristics, as examples.

Returning to FIG. 4, the process performs (412) mitigation processing based on identifying a potential malicious code injection at 410. The mitigation processing can include any desired actions. One such action presents an on-screen challenge for the user to validate whether the user is providing the monitored input to the computer system. The on-screen challenge could require user-interaction to confirm that the monitored input is not being supplied by a malicious actor. For instance, the system could require user interaction to correctly answer a challenge presented on the system's display in order to validate that the user is the one sending the keystrokes. If the action is not completed or is completed incorrectly, the system could perform additional actions like locking out the user or disconnecting the system from network. In general, display of an on-screen prompt can be for the user to indicate, by challenge or otherwise, whether the identified potential malicious code injection of the monitored input is legitimate input from the user.

When the user validates that anomalous input is legitimate, for instance by completing the on-screen challenge, the process can refine the user profile and update the baseline of expected characteristics to reflect an expanded user input skillset that incorporates characteristics of the monitored input. The system could adjust the baseline to reflect the new user skill/behavior and avoid future false positives.

Example actions of mitigation processing include logging the user out of the computer system, disconnecting or blocking one or more network connections of the computer system, and logging and reporting an event to a remote server, the event indicating that a potential malicious code injection was identified, as examples.

Although various examples are provided, variations are possible without departing from a spirit of the claimed aspects.

Figure 8:
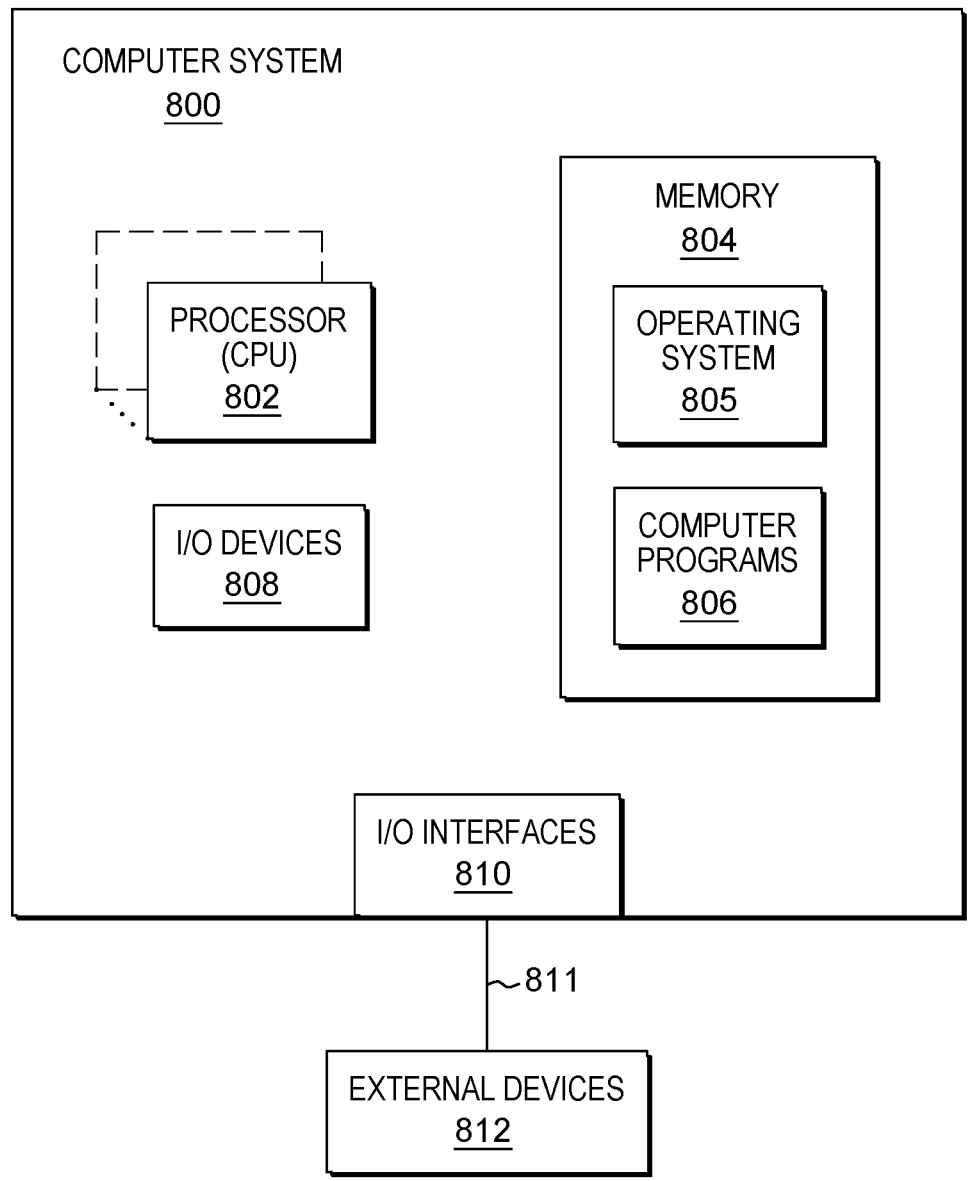
FIG. 8 depicts one example of a computer system and associated devices to incorporate and/or use aspects described herein.

Processes described herein may be performed singly or collectively by one or more computer systems, such as a user computer or computer system in communication therewith, as examples. FIG. 8 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
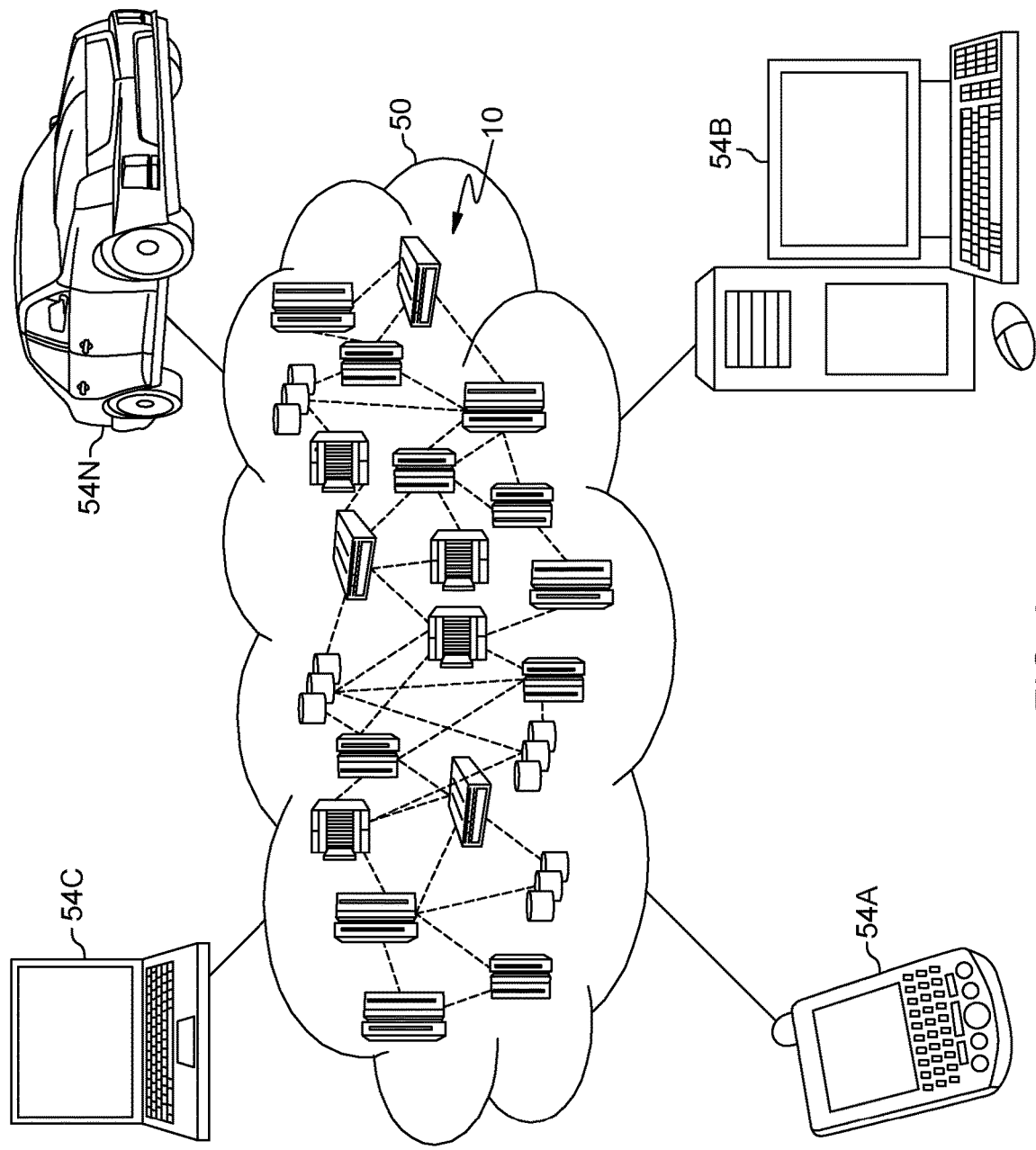
FIG. 9 depicts a cloud computing environment according to an embodiment of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
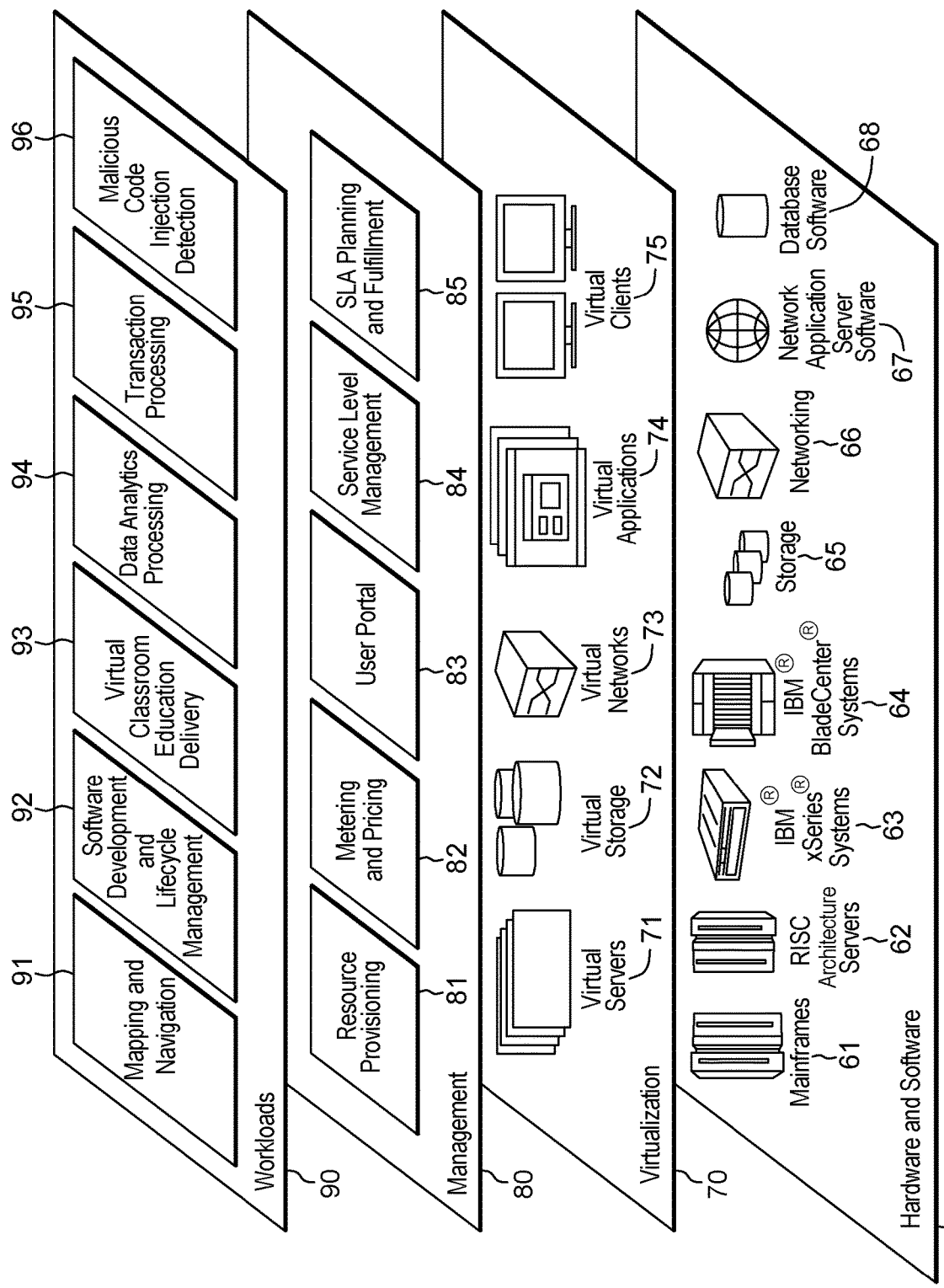
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and malicious code injection detection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   tracking characteristics of user input by a user to a computer system via one or more input devices of the computer system;
   building and maintaining a user profile for that user based on the tracking, the user profile providing a baseline of expected characteristics of Use input by that user, the baseline defined at least in part by the tracked characteristics;
   monitoring input to the computer system in real time as the input is provided to the computer system by first and second physical input devices attached to the computer system, the first and second physical input devices presenting themselves as physical input devices of the computer system, wherein a first portion of the monitored input is provided to the computer system by the first physical input device based on physical interaction by the user with the first physical input device to provide the first portion of monitored input to the computer system, and wherein a second portion of the monitored input is provided to the computer system by the second physical input device automatically and not based on physical interaction by the user with the second physical input device to provide the second portion of monitored input to the computer system;
   identifying, based on the monitoring and on a comparison of characteristics of the monitored input to the baseline of expected characteristics, a potential malicious code injection as part of the monitored input to the computer system; and
   performing mitigation processing based on identifying the potential malicious code injection.

2. The method of claim 1, wherein the identifying comprises identifying a deviation of the characteristics of the monitored input from the baseline of expected characteristics, the deviation exceeding a predefined tolerance level, wherein exceeding the predefined tolerance level indicates a potential malicious code injection included in the monitored input to the computer system, and wherein one or more actions of the mitigation processing are selected based on a severity of the deviation of the characteristics of the monitored input from the baseline of expected characteristics.

3. The method of claim 2, wherein the computer system comprises a plurality of predefined tolerance levels of increasing degree of severity, wherein the plurality of predefined tolerance levels define when to trigger the mitigation processing and which actions to trigger as part of the mitigation processing.

4. The method of claim 3, wherein the identifying the potential malicious code injection is based on the comparison indicating at least a threshold amount of deviation from the baseline of expected characteristics in at least one characteristic of the monitored input, the at least one characteristic being selected from the group of consisting of: speed of character input from an input device of the first and second physical input devices, navigation using one or more PATH variables, invocation of keyboard shortcuts, invocation of operating system navigation shortcuts, invocation of system management or administrative tools via a command line interface, and invocation of unexpected software functions given a defined role of the computer system.

5. The method of claim 4, wherein the mitigation processing comprises an action of presenting an on-screen challenge for the user to validate whether the user is providing the potential malicious code injection of the monitored input to the computer system, wherein the on-screen challenge requires user-interaction to confirm that the potential malicious code injection of the monitored input is not being supplied by a malicious actor.

6. The method of claim 5, wherein based on the user failing to correctly complete the on-screen challenge, the performing the mitigation processing comprises performing one or more additional actions to secure the computer system.

7. The method of claim 5, wherein based on the user correctly completing the on-screen challenge, the method further comprises refining the user profile and updating the baseline of expected characteristics to reflect an expanded user input skillset that incorporates characteristics of the monitored input.

8. The method of claim 4, wherein the mitigation processing comprises at least one action selected from the group consisting of: logging the user out of the computer system, disconnecting or blocking one or more network connections of the computer system, and logging and reporting an event to a remote server, the event indicating that a potential malicious code injection was identified.

9. The method of claim 1, wherein the tracking the characteristics comprises obtaining, across periods of time, a time-series collection of data from which the characteristics of the user input are ascertained, wherein the characteristics fluctuate across the periods of time, and wherein the tracked characteristics comprise characteristics of keyboard input, the characteristics of the keyboard input comprising at least one selected from the group consisting of: typing speed of the user, primary language in which the user types, and keyboard shortcut usage.

10. The method of claim 1, wherein the tracked characteristics comprise characteristics about at least one selected from the group consisting of: the user's navigation using PATH environmental variables of an operating system of the computer system, and the user's input-based invocation of executable commands.

11. The method of claim 1, wherein the baseline is further defined at least in part based on:
one or more user characteristics selected from the group consisting of: the user's occupation, the user's primary language, the user's location, and a role of the user; and
computer system characteristics selected from the group consisting of: a role of the computer system, an expected use of the system, software loaded on the computer system, and a location of the computer system.

12. The method of claim 1, wherein the monitored input is provided to an input stream of device input, wherein the monitoring buffers the monitored input from the input stream for comparison of the characteristics of the monitored input to the baseline of expected characteristics, and wherein portions of the monitored input that are not identified as being part of the potential malicious code injection are passed to one or more destinations of the portions of the monitored input.

13. The method of claim 1, wherein the monitored input is indicated as keystroke input, wherein the first physical input device is keyboard device and provides the first portion of keystroke input based on the user typing on the keyboard device, and wherein the second physical input device is a Universal Serial Bus (USB) device that presents itself to the computer system as a keyboard device and provides the second portion of keystroke input automatically without the user typing on the USB device.

14. A computer system comprising:
a memory; and
a processor in communication with the memory, wherein the computer system is configured to perform a method comprising:
tracking characteristics of user input by a user to a computer system via one or more input devices of the computer system;
building and maintaining a user profile for that user based on the tracking, the user profile providing a baseline of expected characteristics of user input by that user, the baseline defined at least in part by the tracked characteristics;
monitoring input to the computer system in real time as the input is provided to the computer system by first and second physical input devices attached to the computer system, the first and second physical input devices presenting themselves as physical input devices of the computer system, wherein a first portion of the monitored input is provided to the computer system by the first physical input device based on physical interaction by the user with the first physical input device to provide the first portion of monitored input to the computer system, and wherein a second portion of the monitored input is provided to the computer system by the second physical input device automatically and not based on physical interaction by the user with the second physical input device to provide the second portion of monitored input to the computer system;
identifying, based on the monitoring and on a comparison of characteristics of the monitored input to the baseline of expected characteristics, a potential malicious code injection as part of the monitored input to the computer system; and
performing mitigation processing based on identifying the potential malicious code injection.

15. The computer system of claim 14, wherein the identifying comprises identifying a deviation of the characteristics of the monitored input from the baseline of expected characteristics, the deviation exceeding a predefined tolerance level, wherein exceeding the predefined tolerance level indicates a potential malicious code injection included in the monitored input to the computer system, wherein one or more actions of the mitigation processing are selected based on a severity of the deviation of the characteristics of the monitored input from the baseline of expected characteristics, wherein the computer system comprises a plurality of predefined tolerance levels of increasing degree of severity, and wherein the plurality of predefined tolerance levels define when to trigger the mitigation processing and which actions to trigger as part of the mitigation processing.

16. The computer system of claim 15, wherein the identifying the potential malicious code injection is based on the comparison indicating at least a threshold amount of deviation from the baseline of expected characteristics in at least one characteristic of the monitored input, the at least one characteristic being selected from the group of consisting of: speed of character input from an input device of the first and second physical input devices, navigation using one or more PATH variables, invocation of keyboard shortcuts, invocation of operating system navigation shortcuts, invocation of system management or administrative tools via a command line interface, and invocation of unexpected software functions given a defined role of the computer system, wherein the mitigation processing comprises an action of presenting an on-screen challenge for the user to validate whether the user is providing the potential malicious code injection of the monitored input to the computer system, wherein the on-screen challenge requires user-interaction to confirm that the potential malicious code injection of the monitored input is not being supplied by a malicious actor, and wherein based on the user correctly completing the on-screen challenge, the method further comprises refining the user profile and updating the baseline of expected characteristics to reflect an expanded user input skillset that incorporates characteristics of the monitored input.

17. The computer system of claim 14, wherein the baseline is further defined at least in part based on:
one or more user characteristics selected from the group consisting of: the user's occupation, the user's primary language, the user's location, and a role of the user; and
computer system characteristics selected from the group consisting of: a role of the computer system, an expected use of the system, software loaded on the computer system, and a location of the computer system.

18. A computer program product comprising:
a computer readable storage medium readable by a processing circuit and storing instructions for execution by the processing circuit for performing a method comprising:
tracking characteristics of user input by a user to a computer system via one or more input devices of the computer system;
building and maintaining a user profile for that user based on the tracking, the user profile providing a baseline of expected characteristics of user input by that user, the baseline defined at least in part by the tracked characteristics;
monitoring input to the computer system in real time as the input is provided to the computer system by first and second physical input devices attached to the computer system, the first and second physical input devices presenting themselves as physical input devices of the computer system, wherein a first portion of the monitored input is provided to the computer system by the first physical input device based on physical interaction by the user with the first physical input device to provide the first portion of monitored input to the computer system, and wherein a second portion of the monitored input is provided to the computer system by the second physical input device automatically and not based on physical interaction by the user with the second physical input device to provide the second portion of monitored input to the computer system;

identifying, based on the monitoring and on a comparison of characteristics of the monitored input to the baseline of expected characteristics, a potential malicious code injection as part of the monitored input to the computer system; and performing mitigation processing based on identifying the potential malicious code injection.

19. The computer program product of claim 18, wherein the identifying comprises identifying a deviation of the characteristics of the monitored input from the baseline of expected characteristics, the deviation exceeding a predefined tolerance level, wherein exceeding the predefined tolerance level indicates a potential malicious code injection included in the monitored input to the computer system, wherein one or more actions of the mitigation processing are selected based on a severity of the deviation of the characteristics of the monitored input from the baseline of expected characteristics, wherein the computer system comprises a plurality of predefined tolerance levels of increasing degree of severity, and wherein the plurality of predefined tolerance levels define when to trigger the mitigation processing and which actions to trigger as part of the mitigation processing.

20. The computer program product of claim 19, wherein the identifying the potential malicious code injection is based on the comparison indicating at least a threshold amount of deviation from the baseline of expected characteristics in at least one characteristic of the monitored input, the at least one characteristic being selected from the group of consisting of: speed of character input from an input device of the first and second physical input devices, navigation using one or more PATH variables, invocation of keyboard shortcuts, invocation of operating system navigation shortcuts, invocation of system management or administrative tools via a command line interface, and invocation of unexpected software functions given a defined role of the computer system, wherein the mitigation processing comprises an action of presenting an on-screen challenge for the user to validate whether the user is providing the potential malicious code injection of the monitored input to the computer system, wherein the on-screen challenge requires user-interaction to confirm that the potential malicious code injection of the monitored input is not being supplied by a malicious actor, and wherein based on the user correctly completing the on-screen challenge, the method further comprises refining the user profile and updating the baseline of expected characteristics to reflect an expanded user input skillset that incorporates characteristics of the monitored input.

* * * * *